(No Model.)

E. T. STARR.
SECONDARY BATTERY ELECTRODE.

No. 290,943. Patented Dec. 25, 1883.

WITNESSES:
Eugene V. Brown,
James Young.

INVENTOR:
Eli T. Starr,
by his Atty
Wm. P. Peyton.

UNITED STATES PATENT OFFICE.

ELI T. STARR, OF PHILADELPHIA, PENNSYLVANIA, ASSIGNOR OF ONE-HALF TO WILLIAM J. PEYTON, OF WASHINGTON, DISTRICT OF COLUMBIA, AND H. M. LEWIS AND JAMES W. WHITE, OF PHILADELPHIA, PENNSYLVANIA.

SECONDARY-BATTERY ELECTRODE.

SPECIFICATION forming part of Letters Patent No. 290,943, dated December 25, 1883.

Application filed July 11, 1883. (No model.)

*To all whom it may concern:*

Be it known that I, ELI T. STARR, of the city and county of Philadelphia, in the State of Pennsylvania, have invented certain new and useful Improvements in Secondary-Battery Electrodes, of which the following is a specification.

My invention relates more especially to electrodes for secondary batteries of the well-known Planté type, which depend for their action upon the oxidation and reduction of lead. As a general proposition, the efficiency of a secondary battery is proportional to the chemical action taking place in the cell, and this in turn is controlled by the extent of surface of the electrodes exposed in the battery.

The object of my invention is to provide an electrode of comparatively light weight and small bulk, presenting a large surface for the accumulation of the energy of the charging-current, and so constructed that the "formation" of the electrode may be rapidly accomplished, while the usual cracking or peeling off or detachment of the active porous layer or surface will be prevented.

Another object of my improvement is to facilitate the manufacture of electrodes of large capacity, as before recited, and, further, to improve the electrode itself in several respects, as will hereinafter appear.

The subject-matter claimed is particularly recited at the end of the specification.

Figure 1:
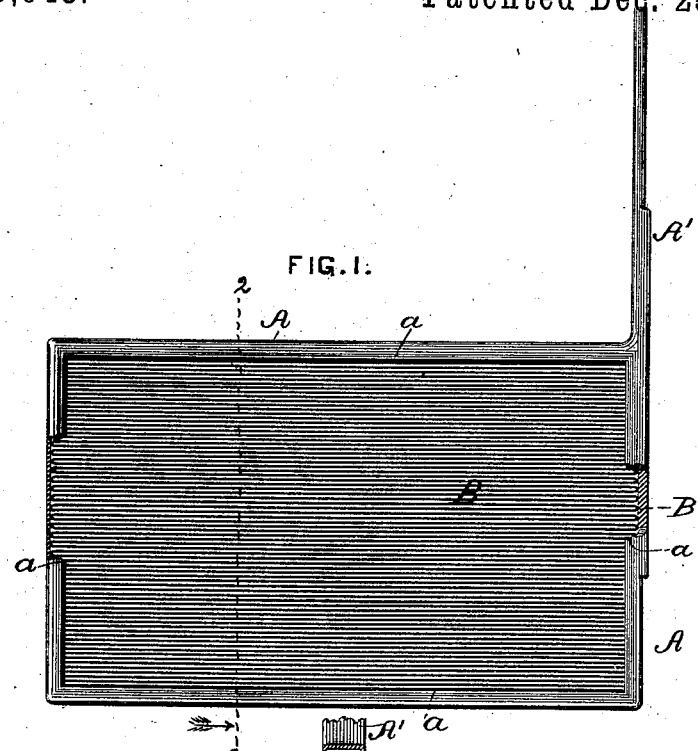
Figure 2:
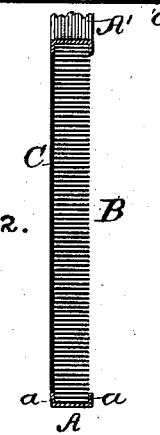

In the accompanying drawings, which show my improved electrode as constructed in the best way now known to me, Figure 1 is a face view, showing the frame around the edges of the electrode as partly broken away. Fig. 2 is a vertical section therethrough on the line 2 2 of Fig. 1; and Fig. 3 is an enlarged sectional view, similar to that of Fig. 2, of a portion of the electrode, showing the active porous layer or surface formed thereon in the formation process.

An open metal frame, A, (preferably of lead,) is formed with flanges $aa$, between which and within said frame a metal ribbon or strip or strips, B, (preferably of lead,) of many folds or layers, is secured. The folds or layers of the ribbon or strips B run, preferably, lengthwise of the frame A when rectangular, as shown in Fig. 1. The ribbon or strip is preferably quite thin, so as to enable many layers or folds to be packed within the frame A. After the folded ribbon or strips is or are secured in the frame A, it is or they are preferably united thereto—for instance, by solder applied around the edges or flanges of said frame, or by applying to said flanges a hot iron to melt them and the edges of the ribbon together; but this is not essential, although highly desirable. Said frame is provided with a lip or extension-piece, A', for connection with the circuit-wires or conductors.

Figure 3:
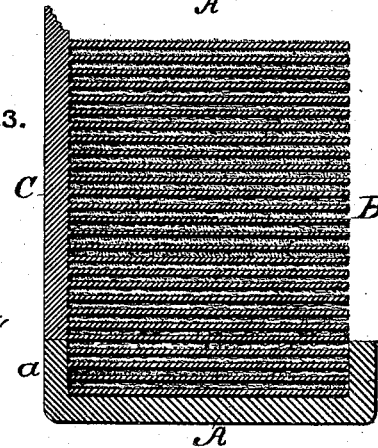

Instead of depending upon the frame A alone as the support and connection for the ribbon or strips, I preferably connect all the layers of the ribbon on one of the broad sides of the electrode by means of lead, which in a melted state is poured over the edges of the ribbon, to connect them and form a continuous plate, C, at the back, as clearly shown in Figs. 2 and 3. By this means the strips or layers at one edge or face are all firmly connected together and united into a continuous plate, which is also continuous with the metal frame A, being united thereto by a close joint, as shown in said last-mentioned figures, and as above described.

By the above-described construction the front edges or face of the ribbon or strips B are free to yield slightly during the process of forming the electrode or battery, while free access of the electrolytic liquid between the strips or layers is also afforded. Furthermore, the accumulating forces are free to act while extensive surface is exposed to chemical action. In addition, good conducting-connections are formed throughout, so that a durable and very efficient electrode is provided.

From what has been said it will be seen that I have a flanged or grooved frame, A, which surrounds and receives the edges of the body or active portion B of the electrode, and securely retains said body portion therein. This open-sided flanged or grooved frame is an important feature of my present invention, and, as before stated, I prefer said frame to be a conducting-frame of lead.

The preferred manner of constructing the electrode is as follows: A preferably continuous metal strip or ribbon is first prepared by subjecting it to the action of dilute nitric acid for from, say, six to twelve hours, or until its surface is cut or eaten into or rendered porous to a certain extent, which facilitates the formation process. This step is not essential, however, as the formation may be accomplished in the usual manner. The ribbon is cut so as to have one bright edge, and is then packed or folded in the frame A, the top edge or portion of which is left open by being bent back, for instance, while the front flange, $a$, of said frame is also bent down or outward, so as not to interfere with the packing operation. When the frame has been filled with the layers or strips of thin or ribbon lead, its top edge is bent down into place, as in Fig. 1, and soldered, and said layers or strips are united at their back or bright edge or rear face by lead or solder, and also to the frame A, so as to form a continuous conducting connection and support, as before fully described, and the front flange, $a$, is bent up or inwardly upon the edge of the ribbon or strips, so as to be in good and secure contact therewith, as before recited. During the packing or filling of the frame A with the ribbon or thin strips B said frame may be supported in a suitable mold or box.

I am aware of English Patent No. 2,782 of 1881, and do not claim herein anything shown in said patent. Said patent does not show or describe a surrounding grooved or flanged frame, nor a frame for layers or strips or sheets of metal, which has flanges at front and rear to be closed upon and united to the edges of said layers, strips, or sheets, whereby the said layers or strips are securely fastened in the open frame and perfectly united thereto by melting or soldering to secure a conducting-connection, and at the same time the surfaces of the strips or sheets are left perfectly exposed to the electrolyte and to chemical action. In the English patent the layers or strips are soldered directly to an unflanged frame, and this cannot be done without extreme care, so as to secure the strips firmly in the frame, nor can a perfect conducting-connection with all the strips or layers be secured by such a construction. In addition, without a flange frame it is difficult and expensive to construct an electrode consisting of an open-sided metal frame, inclosing and securely holding layers or sheets of thin metal to be chemically affected. With the flanged frame claimed by me the layers are readily and accurately filled in the frame, and then, as before stated, securely and effectively connected therewith.

I claim herein as my invention—

1. An electrode for electric batteries, having a grooved or flanged open-sided conducting-frame entirely surrounding the edges of the main or body portion of the electrode and overlapping said body portion at front and rear, and said frame and body portion, at the edges of the latter, being firmly united together so as to constitute the electrode a strong substantial plate, substantially as described.

2. A secondary-battery electrode having an open metal frame encircling or inclosing folds or layers of metal ribbon or strips, and said frame having at its front and rear a lip or flange closed upon the edges of said folds or layers and united thereto, whereby increased strength and a better connection between the frame and layers are secured, substantially as described.

In testimony whereof I have hereunto subscribed my name this 20th day of July, A. D. 1883.

ELI T. STARR.

Witnesses:
WM. J. PEYTON,
JOHN URIAN.